United States Patent [19]
Harrington

[11] 4,066,036
[45] Jan. 3, 1978

[54] COMMAND BAR SYSTEM
[75] Inventor: James Nelson Harrington, Olathe, Kans.
[73] Assignee: King Radio Corporation, Olathe, Kans.
[21] Appl. No.: 742,751
[22] Filed: Nov. 18, 1976
[51] Int. Cl.² ............................................. G01D 13/00
[52] U.S. Cl. ........................ 116/114 R; 116/DIG. 43; 116/129 D; 324/146
[58] Field of Search ............. 73/178 R, 178 T, 178 H; 116/129 R, DIG. 43, 114 R, 136.5; 33/328; 324/146

[56] References Cited
U.S. PATENT DOCUMENTS
2,676,408 4/1954 Alkan ................................ 73/178 R
3,583,360 6/1971 Wehrung ............................ 116/129

Primary Examiner—Donald O. Woodiel
Attorney, Agent, or Firm—Lowe, Kokjer, Kircher

[57] ABSTRACT

A command bar gives pitch and roll commands to an aircraft pilot. The command bar is carried on a magnet assembly which is supported to pivot on a pair of perpendicular edges that correspond to the pitch and roll axes. A permanent bar magnet included in the assembly has its opposite ends received within bobbins on which coils are wound. The coils are arranged in a plurality of separate tiers located above and below the ends of the magnet. Fields are generated by the coils to selectively deflect the magnet in a manner to effect pitch and roll movement of the command bar.

10 Claims, 5 Drawing Figures

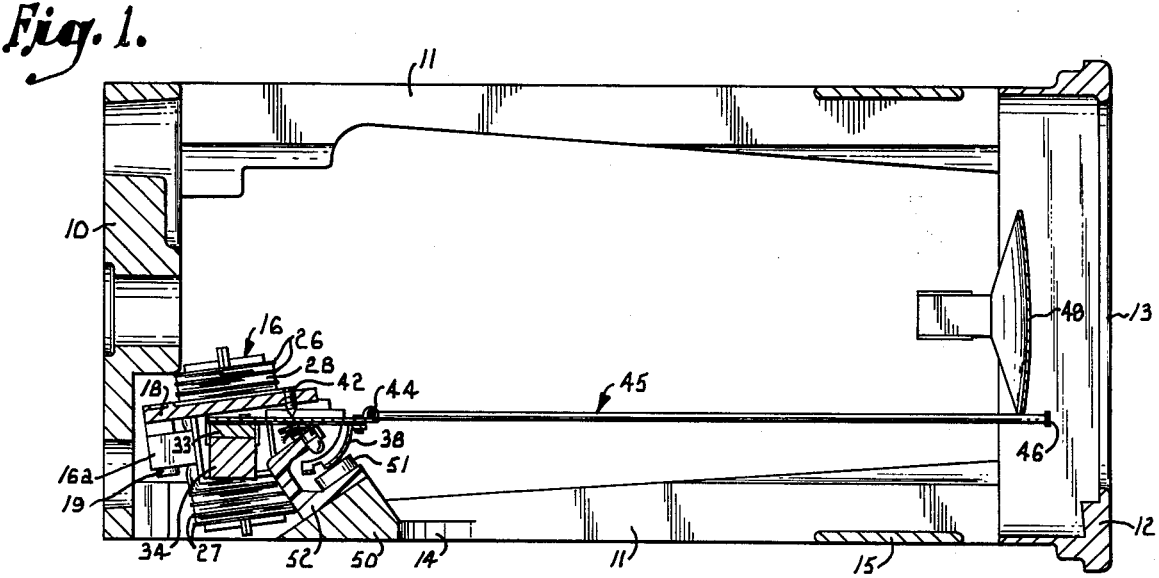
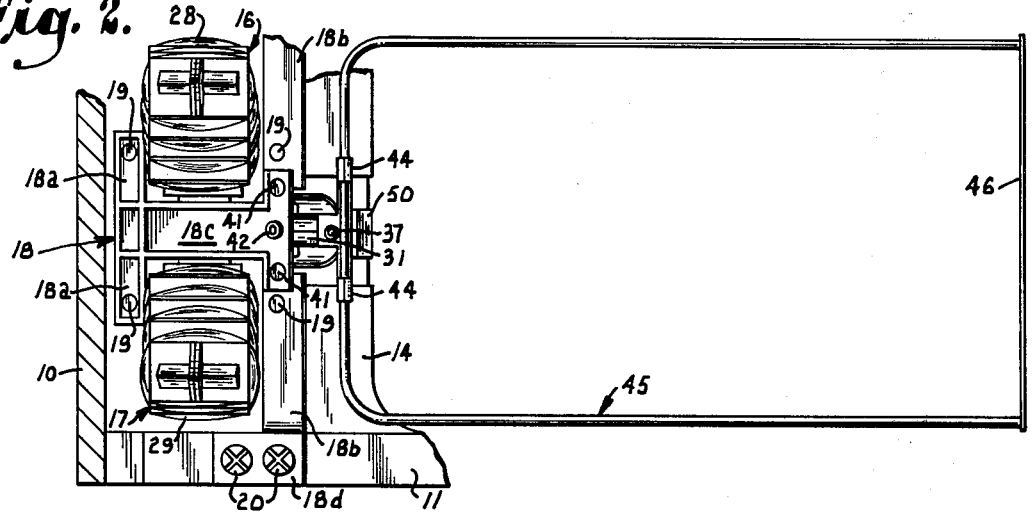
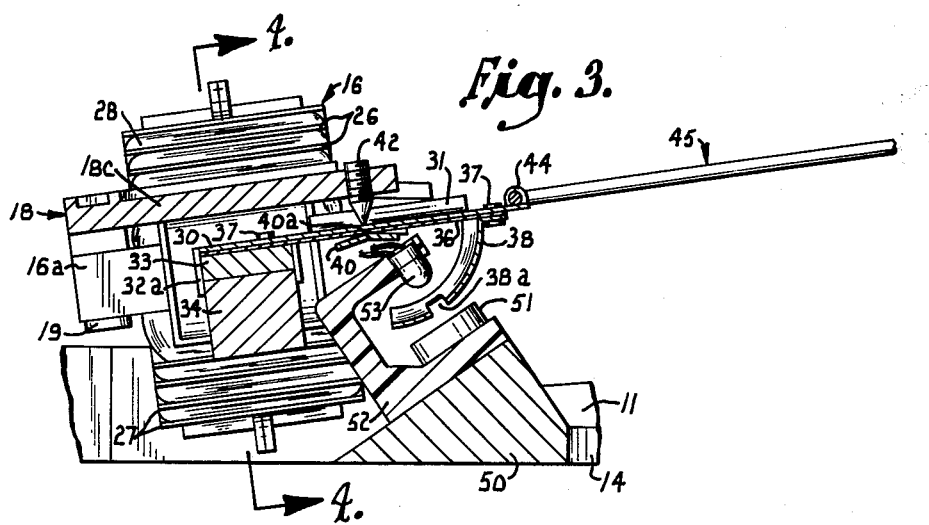

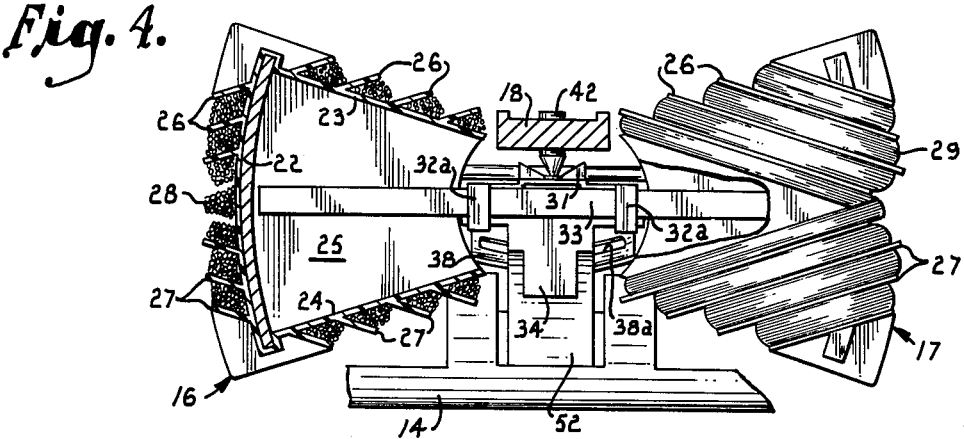
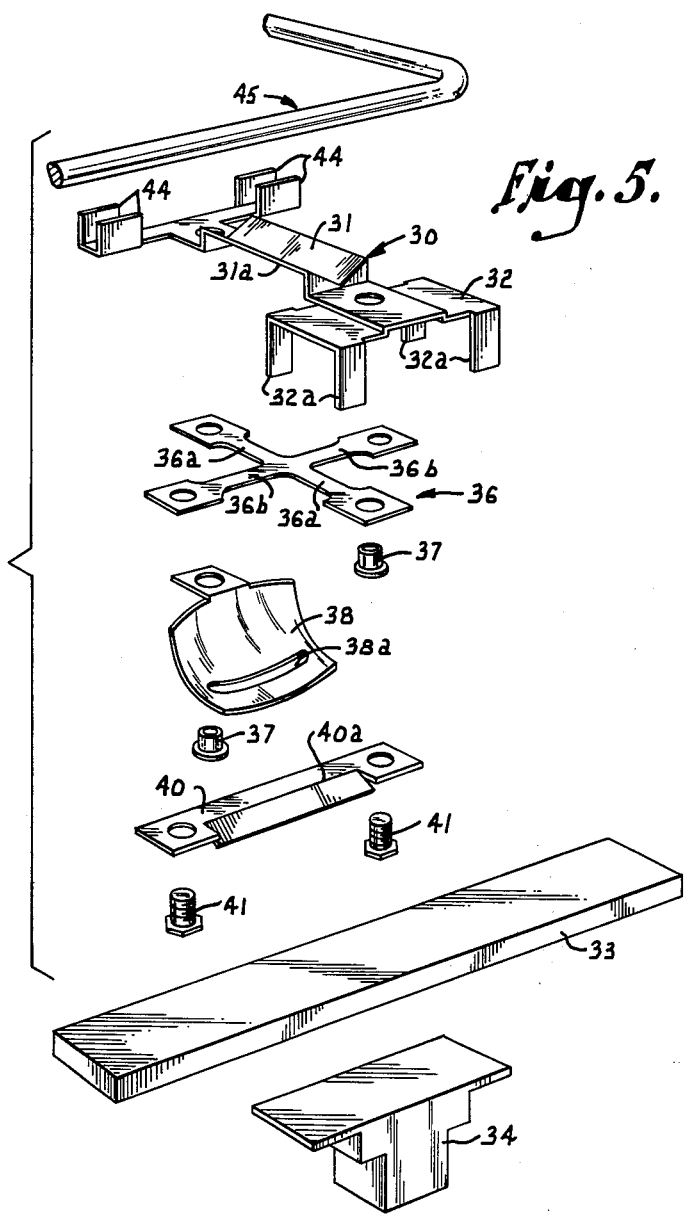

COMMAND BAR SYSTEM

BACKGROUND AND SUMMARY OF THE INVENTION

This invention relates to an improved command bar system which is used in aircraft to indicate pitch and roll information.

Command bars for aircraft serve to convey information to the pilot concerning pitch and roll conditions such as the deviation from a desired altitude. There are two basic types of command bar systems, one of which is known as a double cue system. These double cue systems require a pair of separate meters, one for the pitch mode and one for the roll mode. The pitch meter includes an indicator arm which moves about the pitch axis of the aircraft in a manner to display pitch commands. The roll meter acts similarly to indicate roll commands by means of a meter arm. The information concerning the pitch and roll commands is either displayed visually to the pilot so that he can respond to the indications given by the meters, or it is used in the autopilot mode with the command bars monitering the response of the autopilot. The necessity of providing separate meters for the pitch and roll modes has made existing command bar systems of the double cue type highly complicated and expensive. The cost and complexity is further increased due to the tendency of such meters to incorporate a large number of precision parts, including damping devices, and the like.

The other type of system is known as a single cue system because it indicates both pitch and roll commands with a single meter arm. The conventional single cue command bar is more expensive and complicated even though only a single indicator arm is needed, and has not been satisfactory in all respects. For example, some single cue systems provide complex components such as various types of motors, gears and flex pivots which obviate the economy and complicate the single cue command bar arrangement. Moreover, existing single cue instruments are typically inordinately large and they tend to require large quantities of electrical power, thus greatly adding to their operating expense. Units that utilize electromagnets to displace a magnet typically include several rather large coils which draw inordinate amounts of power. Also, the coils are somewhat distant from the magnet so that the power is not utilized to the full potential in deflecting the magnet.

It is an important object of the present invention to provide a single cue command bar system which is improved in its cost and operational characteristics as compared to existing single cue command bar instruments.

It is another object of the invention to provide a command bar system in which a magnet assembly that carries the indicator bar is mounted to pivot about a pair of edges which correspond to the pitch and roll axes.

A further object of the invention is to provide a command bar system wherein the pitch and roll functions are independent so as not to interfere with or otherwise adversely affect one another.

An additional object of the invention is to provide a command bar system that includes unique bobbins on which coils are wound in a manner to take full advantage of the fields used to deflect the magnet.

Yet another object of the invention is to provide a command bar system in which the magnet is located as close as possible to the coils in order to maximize its deflection with a minimum amount of power. The novel configuration of the bobbins and the arrangement of the coils thereon is important in this respect since the magnet ends are able to extend into the bobbins within the high intensity areas of the fields.

A further object of the invention is to provide a command bar system which operates accurately and reliably with a small number of precision parts.

Other and further objects of the invention, together with the features of novelty appurtenant thereto, will appear in the course of the following description of the drawings.

DETAILED DESCRIPTION OF THE INVENTION

In the accompanying drawings which form a part of the specification and are to be read in conjunction therewith, and in which like reference numerals are employed to indicate like parts in the various views:

FIG. 1 is a side elevational view in cross section illustrating the command bar instrument of the present invention, with the magnet assembly and command bar in the nonenergized retracted position;

FIG. 2 is a top plan view of the command bar instrument shown in FIG. 1, with portions broken away for illustrative purposes;

FIG. 3 is a fragmentary sectional view similar to FIG. 1 but on an enlarged scale and with the magnet assembly raised to its neutral operating position;

FIG. 4 is a fragmentary view taken in cross section generally along line 4—4 of FIG. 3 in the direction of the arrows; and FIG. 5 is an exploded perspective view illustrating the components of the magnet and command bar assembly.

Referring initially to FIG. 1, the command bar system of the present invention is supported on a frame which includes an end plate 10 from which horizontal frame members 11 extend. Members 11 connect at their opposite ends with a forward end plate 12 which includes a transparent panel 13. Cross members 14 and 15 extend integrally between members 11 at locations spaced from one another and from end plates 10 and 12.

A pair of plastic bobbins 16 and 17 have projecting lugs 16a and 17a which are connected to the underside of respective arm portions 18a and 18b of a mounting bracket 18 by screws 19. As best shown in FIG. 2, arms 18a and 18b project on opposite sides of the central body portion 18c of the bracket. Bobbins 16 and 17 are mounted between arms 18a and 18b on opposite sides of the body 18c. Each arm 18b carries an enlarged mounting lug 18d on its outer end (one of which is shown in FIG. 2). Screws 20 connect each lug 18d with member 11 and thus securely mount bracket 18 (and bobbins 16 and 17) to the frame.

Bobbins 16 and 17 are constructed substantially identically but are reversed in position, and only one of the bobbins will be described in detail.

Referring to FIG. 4 in particular, bobbin 16 is a hollow structure having a curved outer end wall 22, an inclined top panel 23, an inclined bottom panel 24, and a pair of parallel side walls 25 (one of which is visible in FIG. 4). Wall 22 has a center of curvature located at the center of the bar magnet that will be described hereinafter. The top panel 23 and the bottom panel 24 incline downwardly and upwardly, respectively, as they extend inwardly away from the end wall 22. Preferably, the inclination of panels 23 and 24 is approximately 20° from horizontal.

The upper half of bobbin 16 is provided with four flanges 26 which extend around the bobbin along the top panel 23, both side walls 25, and the end wall 22. The flanges project outwardly from the surface of the bobbin and are spaced apart equally from one another. Four lower flanges 27 are formed similarly on the lower half of bobbin 16 to extend along the bottom panel 24, both side walls 25, and the outer end wall 22. The upper flanges 26 are inclined upwardly at approximately 18° as they extend inwardly, while the lower flanges 27 are each inclined downwardly at approximately 18° as they extend inwardly.

Bobbins 16 and 17 serve as cores around which receptive coils 28 and 29 are wound. The spaces between the flanges 26 and 27 present tracks in which separate tiers of the coils are wound. The upper flanges 26 of bobbin 16 present four tracks which receive the upper half of coil 28 in four tiers that are separated from one another by flanges. Four tiers which comprise the lower half of coil 28 are similarly disposed within tracks formed between the lower flanges 27. Due to the incline of flanges, each half of coil 28 is inclined approximately 18° from horizontal with the upper and lower tiers being inclined opposite to one another.

As previously indicated, bobbin 17 is constructed substantially the same as bobbin 16 although its orientation is reversed. Coil 29 is arranged on bobbin 17 similarly to the arrangement of coil 28 on bobbin 16, as FIG. 4 best illustrates.

Turning now to FIG. 5, the various components of the magnet assembly are illustrated in detail. A yoke member 30 has a central body portion 31 which is formed in bent fashion to present a downwardly facing edge 31a extending along its length. Edge 31a is oriented to extend along the roll axis of the aircraft in which the instrument is mounted. At one end of body 31, the yoke has a transverse bracket arm 32 in which a bar magnet 33 is received. The magnet is centered with respect to bracket arm 32. A weight 34 is attached centrally against the underside of magnet 33 for stability. Flanges 32a formed on arm 32 are crimped beneath the magnet and weight to secure them to the yoke.

A thin, cross-shaped leaf spring 36 is secured to the underside of yoke 30 by a pair of rivets 37. Longitudinal arm 36a of the spring extend along the underside of body 31 against edge 31a and are secured to the yoke by the rivets. One of the rivets 37 also mounts a curved shutter 38 to the yoke, with the shutter projecting generally downwardly from the yoke. Shutter 38 has a laterally elongated slot 38a which serves a purpose that will be explained in greater detail.

The leaf spring 36 has laterally extending arms 36b by which the magnet assembly is flexibly attached to the frame of the instrument. A small plate 40 is bent along its length to present an edge 40a that faces upwardly. A pair of screws 41 secure plate 40 against the underside of spring 36 with the plate edge 40a extending along the lateral arms 36b. Screws 41 are also threaded into the underside of arms 18b (see FIG. 2), thereby securing the magnet assembly to the frame bracket 18.

It is noted that edge 31a is located on top of edge 40a, with the thin leaf spring 36 interposed therebetween. The edges are perpendicular to one another to thus establish essentially a single point of contact between plate 40 (which is rigidly connected with the frame) and yoke 30 (which is connected with the frame solely through the thin leaf spring 36). Accordingly, with edges 31a and 40a oriented to correspond respectively to the roll and pitch axes of the aircraft in which the instrument is mounted, the magnet assembly is able to pivot about the edges in movement corresponding to roll and pitch movement. A set screw 42 (FIG. 3) is threaded downwardly through bracket 18 and has a conical tip which is located directly above the edge 31a of yoke 30 to assist in damping out vibration of the magnet assembly. The opposite ends of magnet 33 are located within bobbins 16 and 17, as best shown in FIG. 4.

The end of yoke 30 opposite bracket arm 32 is provided with spaced pairs of flanges 44 within which the base portion of a large U-shaped-bracket 45 is received. Flanges 44 are crimped around the bracket to secure same to the magnet assembly. The elongate legs of bracket 45 extend forwardly along opposite sides of the instrument and are connected at their forward ends with the opposite ends of a command bar 46 (see FIG. 2). The command bar 46 is normally oriented horizontally but is carried in pitch and roll movement as bracket 45 is moved in response to movement of the magnet assembly.

A curved display disc 48 (FIG. 1) is mounted to a gyroscope element (not shown) at a location somewhat behind the transparent panel 13. The face of disc 48 is marked such that it is able to indicate relatively the extend to which the command bar 46 is moved in both the pitch and roll directions.

The frame cross member 14 has an integral boss 50 (FIGS. 1 and 3) to which a photocell 51 is secured. A holding bracket 52 is mounted to the boss, and the bracket supports a light emitting diode 53 which is spaced somewhat above photocell 51 and oriented to direct light theretoward. The curved shutter 38 has its slow 38a located between the photocell 51 and diode 53. The long axis of slot 38a is generally transverse to the frame, and the slot moves up and down with respect to the photocell upon deflection of the shutter in the pitch direction. Accordingly, the position of impact of the light on the photocell varies when the magnet assembly is moved in the pitch direction. Due to its elongate shape, slot 55 directs the light to the same position on the photocell 51 when roll displacement occurs In operation, the action of the leaf spring 36 locates bar 46 in a retracted position below the display disc 48 with the power off. When the power is turned on, the current applied to coils 28 and 29 lowers magnet 33 to the position shown in FIG. 3. In this position, the command bar 46 is raised from the retracted position to its normal operating position at which it is oriented horizontally across the center of disc 48 to indicate neutral pitch and roll conditions.

The coils 28 and 29 may be excited with current in selected fashion to generate fields that move magnet 33 relative to the pitch and roll axes. For example, if the current direction in each coil is such that the fields tend to force each end of magnet 33 upwardly, yoke 30 pivots on edge 40a in a manner to lower bar 46, indicating on disc 48 a downward pitch condition. Conversely, with the coils excited to move both ends of magnet 33 downwardly, bar 46 is moved upwardly to display an upward pitch indication on the disc.

For the display of roll commands, the current is applied to coils 28 and 29 in a manner to force one end of the magnet 33 up and the other end of the magnet down. This pivots yoke 30 on edge 31a, and bar 46 thereby rotates clockwise or counterclockwise on disc 48 to display the direction and extent of the roll movement. The distance that the magnet moves in either the pitch or roll direction is proportional approximately to the amount of current that is applied to the coils. Since the magnet and command bar assembly is mounted on a single contact point (the intersection of edges 31a and 40a), the pitch and roll movements are independent and do not affect one another, and they may be carried out simultaneously.

The photocell, diode, and shutter arrangement provides a closed loop mode for the pitch movement. When magnet 33 moves in the pitch direction, the shutter slot 38a is carried out of its usual centered position with respect to photocell 51. The photocell then receives light through the slot at a different position, and the resulting change in the photocell output voltage may be used in a conventional manner to verify that the actual pitch position is in the position commanded according to the voltage applied to coils 28 and 29. The closed loop mode thus provides feedback information which essentially compares the actual pitch position with the commanded position. Due to the elongate configuration of slot 38a, roll movement does not affect the photocell voltage or the feedback loop.

The configuration and location of bibbins 16 and 17 and their coils 28 and 29 with respect to the magnet is significant in achieving a high degree of sensitivity and accuracy of the instrument with low power requirements. Since magnet 33 extends actually within the bobbins at its opposite ends, it is located in the high intensity areas of the fields created by the coils. Due to the inclined position of the upper and lower halves of the coils, the magnet ends are actually within the two central tiers of each coil, as shown in FIG. 4. At the same time, the magnet is able to move as required with respect to both the pitch and roll axes without contacting the bobbins. Consequently, the current required to displace the magnet is minimized without unduly restricting the extent to which the magnet is able to deflect.

The fields that are applied to the magnet ends are on tangent lines with respect to both the pitch and roll axes so that the moment force about the axes is maximized. The relatively small horizontal components of the fields that result from the inclined position of the coils are negligible as compared to the predominant vertical field which is induced. Therefore, the field is directed substantially vertically or perpendicular to both the pitch and roll axes.

The pilot may view the position of the command bar 46 through the transparent panel 13 to receive the pitch and roll information. Alternatively, information concerning the position of the command bar may be used in the autopilot mode to monitor the response of the autopilot. In either case, the instrument provides accurate information of the pitch and roll commands as determined by the position of the command bar.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. A command bar device for providing pitch and roll information, said device comprising:
   a frame;
   a magnet assembly including a permanent magnet;
   means mounting said magnet assembly to said frame for pivotal movement about a pair of mutually perpendicular axes corresponding to pitch and roll axes;
   a command bar coupled with said magnet assembly for movement therewith about said axes;
   a pair of coils supported on said frame in proximity to said magnet, said coils being operable to receive current to produce fields for selectively deflecting said magnet in a manner to pivot said magnet assembly about each of said axes, thereby displacing said command bar with respect to said axes in movement corresponding to pitch and roll movement; and
   means providing an indication of the direction and extent to which said command bar is displaced with respect to said axes.

2. A device as set forth in claim 1, wherein said mounting means includes a pair of edges on which said magnet assembly is supported to pivot, said edges being oriented substantially perpendicular to one another to correspond with the pitch and roll axes.

3. A device as set forth in claim 1, wherein said mounting means includes:
   a first edge presented on said frame to correspond with one of the pitch and roll axes; and
   a second edge presented on said magnet assembly, said second edge corresponding with the other of the pitch and roll axes and being located substantially perpendicular to said first edge on top of same, said magnet assembly being pivotal about said first and second edges.

4. A device as set forth in claim 3, including a leaf spring interposed between said first and second edges and coupled with each to resiliently mount said magnet assembly.

5. A device as set forth in claim 1, wherein said magnet is a bar magnet having opposite ends, and including a pair of bobbins on which the respective coils are wound, said bobbins being supported on said frame at spaced apart locations in proximity to the opposite ends of said magnet.

6. A device as set forth in claim 5, including flange means on said bobbins presenting a plurality of separate tracks in which said coils are arranged in a plurality of separate tiers, and flange means separating each tier from the remaining tiers.

7. A device as set forth in claim 5, wherein said bobbins are hollow members in which the opposite ends of said magnet are loosely received.

8. A device as set forth in claim 7, wherein said coils include upper portions wound on said bobbins substantially above the magnet ends and lower portions wound on said bobbins substantially below the magnet ends.

9. A device as set forth in claim 8, wherein the upper and lower portions of said coils are inclined with respect to the magnet ends, the upper portion of each coil being inclined oppositely to the inclination of the lower portion thereof.

10. A device as set forth in claim 1, including a light source and a photocell spaced apart from one another on said frame with said light source oriented to direct light generally toward said photocell, and a shutter coupled with said magnet assembly for movement therewith in the space between said light source and photocell, said shutter having means for controlling the receipt of light by said photocell in accordance with the position of said magnet assembly with respect to said axes.

* * * * *